United States Patent
Ramler et al.

(10) Patent No.: US 10,803,741 B2
(45) Date of Patent: Oct. 13, 2020

(54) SYSTEM AND METHOD FOR RECORDING AN IMAGE SEQUENCE

(71) Applicant: Bendix Commercial Vehicle Systems LLC, Elyria, OH (US)

(72) Inventors: Travis G Ramler, Fairfield, UT (US); Andreas U Kuehnle, Villa Park, CA (US); Jeffrey R Coleman, Santa Ana, CA (US); Hans M Molin, Mission Viejo, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/220,166

(22) Filed: Dec. 14, 2018

(65) Prior Publication Data

US 2020/0193816 A1 Jun. 18, 2020

(51) Int. Cl.
| | |
|---|---|
| *G08G 1/017* | (2006.01) |
| *B60R 11/04* | (2006.01) |
| *G07C 5/08* | (2006.01) |
| *B60R 1/00* | (2006.01) |
| *B60Q 1/50* | (2006.01) |
| *B60Q 1/00* | (2006.01) |

(52) U.S. Cl.
CPC ......... *G08G 1/0175* (2013.01); *B60Q 1/0023* (2013.01); *B60Q 1/50* (2013.01); *B60R 1/002* (2013.01); *B60R 11/04* (2013.01); *G07C 5/0891* (2013.01); *B60R 2300/102* (2013.01); *B60R 2300/105* (2013.01); *B60R 2300/607* (2013.01); *B60R 2300/802* (2013.01)

(58) Field of Classification Search
CPC .............................. B60R 1/10; G06K 9/00805
USPC .......................................................... 340/433
See application file for complete search history.

(56) References Cited

U.S. PATENT DOCUMENTS

| | | | | |
|---|---|---|---|---|
| 5,351,078 | A * | 9/1994 | Lemelson ............ | H04N 5/7822 348/130 |
| 6,923,080 | B1 | 8/2005 | Dobler et al. | |
| 7,633,382 | B2 | 12/2009 | Bowler | |
| 8,599,260 | B1 | 12/2013 | Vaughn | |
| 8,761,443 | B2 | 6/2014 | Howard et al. | |
| 2006/0269105 | A1* | 11/2006 | Langlinais ............... | G03B 7/08 382/105 |
| 2009/0069973 | A1* | 3/2009 | Li .......................... | G08G 1/165 701/31.4 |
| 2011/0190972 | A1* | 8/2011 | Timmons ............... | G01C 21/34 701/31.4 |
| 2011/0316747 | A1* | 12/2011 | Budianu ................. | G01S 11/00 342/387 |
| 2012/0083960 | A1* | 4/2012 | Zhu ......................... | B60R 1/00 701/23 |

(Continued)

*Primary Examiner* — Fabricio R Murillo Garcia
(74) *Attorney, Agent, or Firm* — Brian Kondas; Cheryl Greenly; Eugene Clair

(57) ABSTRACT

A controller is adapted to receive respective images from a sensors of a first vehicle. The images provide a gapless view along, and within a predetermined perpendicular distance away from, a side of the first vehicle. Movement of a second vehicle along, and within the predetermined perpendicular distance away from, the side of the first vehicle, is detected based on at least one of the images. A position of a front of the second vehicle is predicted based on the movement of the second vehicle. An image sequence is recorded at the position.

26 Claims, 4 Drawing Sheets

(56) References Cited

U.S. PATENT DOCUMENTS

| | | | |
|---|---|---|---|
| 2013/0279742 A1* | 10/2013 | Howard | G06K 9/00791 |
| | | | 382/103 |
| 2015/0199901 A1* | 7/2015 | Schenken | G08G 1/0175 |
| | | | 348/149 |
| 2018/0120859 A1* | 5/2018 | Eagelberg | G05D 1/0088 |
| 2018/0197024 A1* | 7/2018 | Lynam | B60R 1/00 |

* cited by examiner

SYSTEM AND METHOD FOR RECORDING AN IMAGE SEQUENCE

BACKGROUND

The present invention relates to identifying violators of school bus stop notifications. It finds particular application in conjunction with using existing cameras on a vehicle and will be described with particular reference thereto. It will be appreciated, however, that the invention is also amenable to other applications.

Surround view cameras give a driver of a vehicle such as bus or truck (e.g., a heavy vehicle) a bird's eye view of the vehicle surroundings. Surround view systems can typically view objects up to about 5 meters away in all directions.

A school bus commonly has a stop sign along the driver's side of the vehicle. The stop sign is movable between two positions—an inactive position and an active position. In the inactive position, the stop sign is stowed substantially parallel along the driver's side of the vehicle. In the active position, the stop sign is extended and substantially perpendicular to the driver's side of the vehicle. The stop sign normally remains in the inactive, stowed position and extends to the active position before, for example, passengers (e.g., school children) load and/or unload from the school bus.

At least one light (e.g., a flashing red light) is included on the vehicle. The at least one light is normally not energized (e.g., is neither illuminated continuously nor flashed). The at least one light is typically energized (e.g., either illuminated or flash) as the stop sign begins to move from the inactive position to the active position before the passengers load and/or unload from the school bus.

While the stop sign is in the inactive position and the at least one light is not active, drivers of other vehicles are free to drive along side and/or pass the school bus. However, once the stop sign begins to move from the inactive position to the active position and/or the at least one light is energized to either illuminate continuously or flash, drivers of other vehicles traveling in the same direction and, sometimes, in the opposite direction, are forbidden by law to pass the bus and must stop and wait until the sign begins to move to the inactive position before passing along side of the bus.

Although drivers of other vehicles are forbidden by law to pass the bus, there are instances when drivers ignore the law and illegally pass the bus when the stop sign is in the active position and/or the at least one light is energized. It is desirable to utilize the surround view cameras to identify other vehicles illegally passing the bus when the stop sign is in the active position and/or the at least one light is energized.

The present invention provides a new and improved apparatus and method for identifying and recording other vehicles that illegally pass the bus when the stop sign is in the active position and/or the at least one light is energized.

SUMMARY

In one aspect of the present invention, it is contemplated that a controller is adapted to receive respective images from a camera of a first vehicle. The images provide a gapless view along, and within a predetermined perpendicular distance away from, a driver's side of the first vehicle. Movement of a second vehicle along, and within the predetermined perpendicular distance range away from the driver's side of the first vehicle, is detected based on at least one of the images. A position of a front of the second vehicle is predicted based on the movement of the second vehicle. An image sequence is recorded at the position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
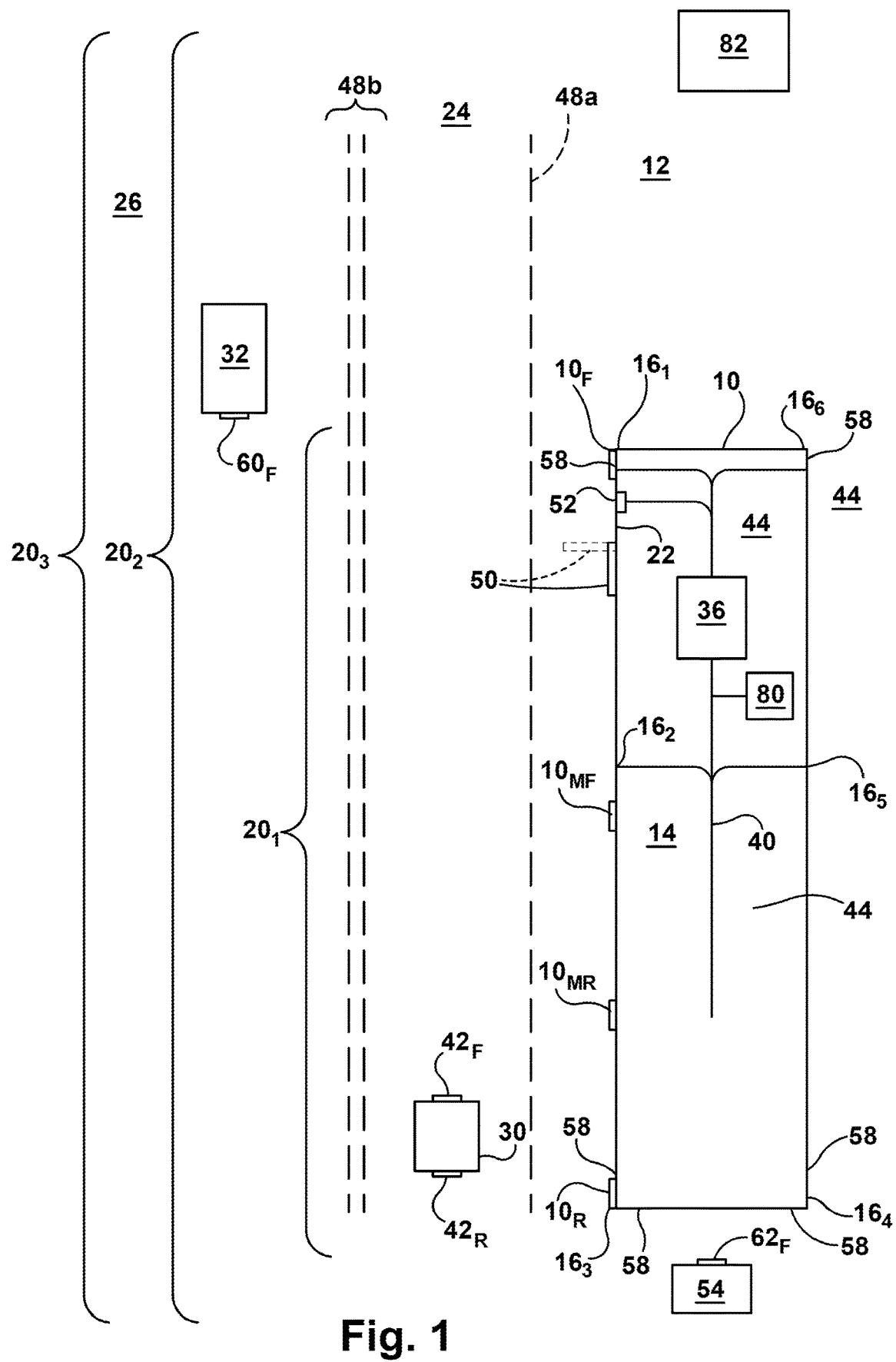
FIG. 1 illustrates a schematic representation of a vehicle in a lane in accordance with one embodiment of an apparatus illustrating principles of the present invention.

With reference to FIG. 1, a simplified component diagram of an exemplary vehicle 10 (e.g., a first vehicle) traveling in a current lane 12 is illustrated in accordance with one embodiment of the present invention.

The vehicle 10 includes a surround view system 14, which is used for providing views substantially around the vehicle 10 to an operator in the vehicle 10. The system 14 includes a plurality of sensors $16_1$, $16_2$, $16_3$, $16_4$, $16_5$, $16_6$ (collectively 16) (e.g., cameras) positioned around the vehicle 10. The sensors 16 are configured and positioned so as to take overlapping views with at least one of the adjacent sensors 16. For example, a view $20_2$ provided by the sensor $16_2$ overlaps with a view $20_1$ of the sensor $16_1$ on one side and overlaps a view $20_3$ of the sensor $16_3$ on the other side. The overlapping views of the adjacent sensors 16 provide a gapless view around the vehicle 10. The sensors $16_1$, $16_2$, $16_3$ provide a gapless view along one side (e.g., the driver side) 22 of the vehicle 10.

At least the sensors $16_1$, $16_2$, $16_3$ along the driver side 22 of the vehicle 10 are angled (e.g., angled outward) to provide a view of at least a predetermined perpendicular distance away from the vehicle 10 (i.e., at least a predetermined perpendicular lateral distance away from the driver's side 22 of the vehicle 10). In one embodiment, the predetermined distance is between about 5 m and 15 m. It is also contemplated that the sensors 16 include wide angle (e.g., "fisheye") lenses for achieving the overlapping views at the predetermined perpendicular distance. In one embodiment, a wide angle lens is a lens covering an angle of view between about 64° and about 84°, which in return translates to an about 24-35 mm lens in 35 mm film format.

In one embodiment, the predetermined distance is between about 5 m and about 15 m away from the side 22 of the vehicle 10 since that distance covers between one (1) and two (2) adjacent lanes. Therefore, the predetermined distance is chosen so that the sensors 16 see (e.g., detect) and provide images including one (1) to two (2) adjacent lanes 24, 26, respectively, away from the side 22 of the vehicle 10. For purposes of discussion, the adjacent lane 24 is referred to as the first adjacent lane, and the adjacent lane 26 is referred to as the second adjacent lane. In the illustrated embodiment, the vehicle 10 is traveling on a four-lane road including the first adjacent lane 24 in which other vehicles (e.g., a second vehicle 30 (e.g., another vehicle)) travel in a same direction as the vehicle 10 and the second adjacent lane 26 in which other vehicles (e.g., a third vehicle 32 (e.g., another vehicle)) travel in an opposite direction as the vehicle 10. Obviously, other embodiments are contemplated in which the vehicle 10 is traveling on a two-lane road in which other vehicles in the first adjacent lane 24 are traveling in the opposite direction as the vehicle 10, or other vehicles in both the first and second adjacent lanes 24, 26, respectively, are traveling in the same direction as the vehicle 10.

The system 14 also includes a controller 36. In one embodiment, the controller 36 electrically communicates with the sensors 16 via a communication bus 40 on the vehicle 10. Of course, other embodiments are also contemplated, such as wireless connections, in which the controller 36 directly communicates with the respective sensors 16.

The controller 36 is adapted to receive respective signals representing images taken by the sensors 16. The controller 36 is also adapted to identify movement of the second vehicle 30 along the driver's side 22 of the vehicle 10 and within the predetermined perpendicular distance away from the driver's side 22 of the vehicle 10. Alternatively, a different sensor (e.g., a radar system) identifies such movement, detecting movement within given angular and distance ranges corresponding to the adjacent lane(s) 24, 26. In one example, based on the signals representing the respective image from at least one of the sensors 16, the controller 36 predicts a position of a front license plate $42_F$ of the second vehicle 30 based on the movement of the second vehicle 30. For example, the controller 36 identifies a rectangular-shaped object that is substantially shaped and sized according to a standard license plate—the relationship between the range and known approximate size of the license plate in an image may be exploited here. The controller 36 then tracks the object (e.g., the front license plate $42_F$) as it travels along the side of the vehicle 10. More specifically, the controller 36 tracks the position, speed and, optionally, acceleration of the front license plate $42_F$ as it travels along the side of the vehicle 10. By tracking the speed (and, optionally, the acceleration) of the front license plate $42_F$, the controller 36 is capable of predicting a position of the front license plate $42_F$ at a particular time. By knowing the expected position of the front license plate $42_F$ at a particular time relative to the vehicle 10, the controller 36 is capable of identifying which of the sensor(s) 16 is/are expected to include an image of the front license plate $42_F$. The controller 36 then records an image sequence at the expected front license plate positions of the second vehicle 30 and receives the respective signals representing images taken by the (multiple) sensors 16 aimed at the expected position at any particular time. Because the sensors 16 have a wide field of view, more than just the license plate will be imaged, and hence lower prediction and tracking precision are tolerable.

When the operator in the vehicle 10 determines passengers 44 will be loading and/or unloading from the vehicle 10, the operator initiates activation of a notification sign 50 to respective operators (e.g., drivers) of other vehicles (e.g., the second vehicle 30). The notification sign is included in the system 14 and may be activated, for example, by the operator (e.g., driver) of the vehicle 10 moving a switch 52 in the vehicle 10. In one embodiment, the switch 52 is connected (e.g., electrically connected) to the vehicle communication bus 40. Moving the switch 52 activates (e.g., electrically activates) the notification sign 50 to move from a non-activated position, which is illustrated by a solid line in FIG. 1, to an activated position, which is illustrated by a dashed line in FIG. 1. Typically, activating the notification sign 50 also activates lights (e.g., blinking red lights) on the notification sign 50 and/or an exterior of the vehicle 10 to notify the drivers of any of the other vehicles (e.g., the second vehicle 30) to stop before entering within the predetermined perpendicular distance away from the driver's side 22 of the vehicle 10.

Depending on local laws and ordinances, when the notification sign 50 is activated on a two-lane road, other vehicles (e.g., a fourth vehicle 54) in the current lane 12 and the first adjacent lane 24 (e.g., the second vehicle 30) are required to stop. When the notification sign 50 is activated on a four-lane road, other vehicles in the current lane 12 (e.g., the fourth vehicle 54), the first adjacent lane 24 (e.g., the second vehicle 30), and the second adjacent lane 26 (e.g., the third vehicle 32) are required to stop.

Figure 3:
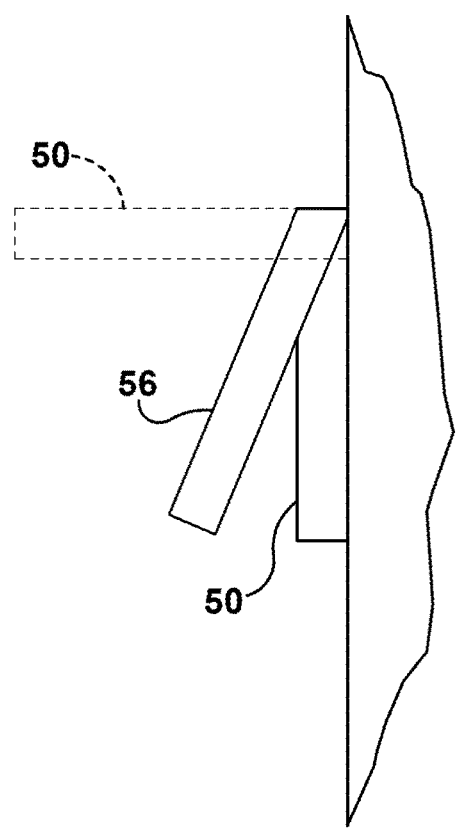
FIG. 3 illustrates a schematic representation of different positions of a notification sign in accordance with one embodiment of an apparatus illustrating principles of the present invention.

In one embodiment, signals received by the controller 36 from at least one of the sensors 16 includes an image of the notification sign 50 and, optionally, lane markings 48a, 48b (collectively 48). With reference to FIGS. 1 and 3, the controller 36 is capable of comparing an image of the notification sign 50 with a template image 56 of the notification sign 50 for determining if the notification sign 50 is activated (e.g., initiated). As in FIG. 1, the notification sign 50 is illustrated in FIG. 3 by a solid line in the non-activated (e.g., inactive) position and a dashed line in the activated position. As the notification sign 50 is moved between the non-activated position (solid line) to the activated position (dashed line), there is a particular predetermined position, which is illustrated by the template image 56, at which the notification sign 50 is assumed to transition from non-activated to activated. More specifically, if the notification sign 50 is at a closer distance to the driver's side 22 of the vehicle 10 than the template image 56, the notification sign 50 is considered to be in the non-activated position. On the other hand, if the notification sign 50 is at a farther distance from the driver's side 22 of the vehicle 10 than the template image 56, the notification sign 50 is considered to be in the activated position. Therefore, the template image 56 is considered to be an image of the notification sign 50 at a transition point between the non-activated and activated positions. If the controller 36 compares the image of the notification sign 50 with the template image 56 and determines the image of the notification sign 50 is not within a predetermined error range of the distance of the template image 56 from the driver's side 22 of the vehicle 10, the controller 36 determines the notification sign 50 is in the activated position. The controller 36 may also determine if the notification sign 50 is in the activated or inactivated position based on a signal received from the switch 52, which is independent of the comparison of the image of the notification sign 50 with the template image 56. Therefore, controller 36 determines if the notification sign 50 is in the activated or inactivated position based on the signal received from the switch 52 and/or based on the comparison of the image of the notification sign 50 with the template image 56.

Alternatively, surround view images detect ego-vehicle blinking stop lights, thereby requiring the nearby drivers to stop.

In another embodiment, signals received by the controller 36 from at least one of the sensors 16 include an image of the ego-vehicle flasher(s) 58 and, optionally, lane markings 48a, 48b (collectively 48). With reference to FIG. 1 the controller 36 is capable of monitoring the known, approximate, locations, typically near the ego-vehicle corners, of the ego-vehicle flasher(s) 58. The ego-vehicle flasher state is monitored (varying, at a known approximate rate, or not varying). Therefore, controller 36 determines if the vehicle flasher(s) 58 are activated or inactivated, which requires the nearby drivers to stop.

With reference to again to FIG. 1, in one embodiment, the controller 36 is adapted to detect movement of any of the other vehicles (e.g., the second vehicle 30, the third vehicle 32, and/or the fourth vehicle 54) that enter within the predetermined perpendicular distance away from the driver's side 22 of the vehicle 10. The controller 36 is also adapted to predict the position of the front (e.g., front license plate $42_F$) of the second vehicle 30, the position of a front (e.g., front license plate $60_F$) on the third vehicle 32, which is travelling in the opposite direction than the vehicle 10, and the position of a front (e.g., front license plate 62F) on the fourth vehicle 54 if the respective vehicle is within the predetermined perpendicular distance away from the driver's side 22 of the vehicle 10.

As discussed in more detail below, in one embodiment, the movement of any of the other vehicles within the predetermined perpendicular distance away from the driver's side 22 of the vehicle 10 is detected using a cross projection involving at least one of the sensors 16. For example, at least one of the sensors 16 transmits the signals representing the images taken perpendicular to the driver's side 22 of the vehicle 10. As discussed above, the images taken by the at least one sensor 16 includes one (1) to two (2) lanes 24, 26 adjacent the driver's side 22 of the vehicle 10. Therefore, the cross projection is also referred to as a cross-lane projection.

Figure 2:
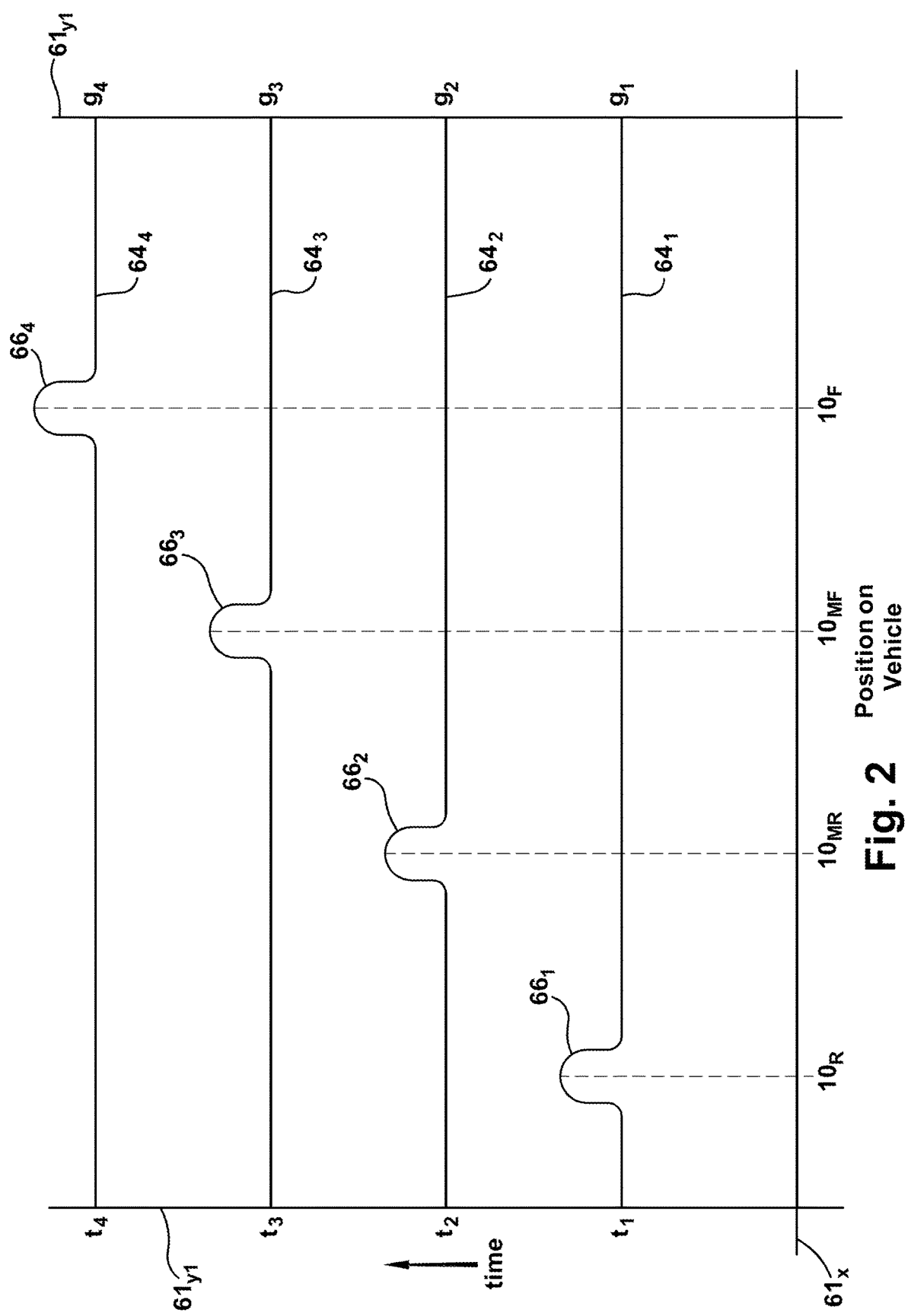
FIG. 2 illustrates a graphs at different times showing deviations from a relatively constant gray level for detecting movement in an adjacent lane in accordance with one embodiment of an apparatus illustrating principles of the present invention.

With reference to FIGS. 1 and 2, in another embodiment, the movement of any of the other vehicles within the predetermined perpendicular distance away from the driver's side 22 of the vehicle 10 (e.g., in the at least one adjacent lane 24, 26) is detected based on a gray level in the at least one adjacent lane 24, 26. For example, in this embodiment, it is assumed an empty adjacent lane (e.g., an adjacent lane with no other vehicle in sight of the sensor) has an approximately fixed gray level, wherein areas of deviation correspond to areas of movement to record. Alternatively, if there is a non-uniform gray level, changes in local gray levels, particularly if in a time-varying and forward direction, correspond to movement in an adjacent lane (e.g., the adjacent lanes 24, 26). A sequential series of changes from a rear of the vehicle $10_R$ (e.g., where the sensors $16_3$, $16_4$ are positioned) toward a front of the vehicle $10_F$ (e.g., where the sensors $16_1$, $16_6$ are positioned) indicates movement and triggers recording. In FIG. 2, the first y-axis $61_{Y1}$ represents increasing time and the second y-axis $61_{Y2}$ represents increasing gray level; the x-axis $61_X$ represents a position of the vehicle 10 from the rear $10_R$ of the vehicle 10 (e.g., where the sensors $16_3$, $16_4$ are positioned) to the front $10_F$ of the vehicle 10 (e.g., where the sensors $16_1$, $16_6$ are positioned). A baseline, relatively constant gray level $g_{1,2,3,4}$ is illustrated on the second y-axis $61_{Y2}$ for respective lines $64_{1,2,3,4}$ (e.g., graphs) at times $t_{1,2,3,4}$. For example, an increased gray level $66_1$ at the rear $10_R$ of the vehicle 10 (see the line $64_1$), followed by an increased gray level $66_2$ at a mid-rearward area $10_{MR}$ of the vehicle 10 (see the line $64_2$), followed by an increased gray level $66_3$ at a mid-forward area $10_{MF}$ of the vehicle 10 (see the line $64_3$), followed by an increased gray level 664 at the front $10_F$ of the vehicle 10 (see the line $64_4$) corresponds to a movement in the at least one adjacent lane 24, 26 (e.g., of the second vehicle 30 in the adjacent lane 24) from the rear $10_R$ of the vehicle 10 toward the front $10_F$ of the vehicle 10, which triggers recording.

In one embodiment, it is also contemplated that the controller 36 is adapted to determine an expected direction of the other vehicles (e.g., the second vehicle 30, the third vehicle 32, and/or the fourth vehicle 54) based on the lane markings 48. For example, if the lane marking 48a is a dashed white marking, the controller 36 is adapted to determine if/when the second vehicle 30 is traveling the same direction as the vehicle 10. On the other hand, if the lane marking 48b is a double-dashed or solid yellow marking, the controller 36 is adapted to determine the third vehicle 32 is traveling the opposite direction as the vehicle 10. It is also contemplated that cross-lane projection may be independently used for each (approximately expected) lane location separately, which allows identifying multiple passing vehicles in the same or opposed directions of travel.

Figure 4:
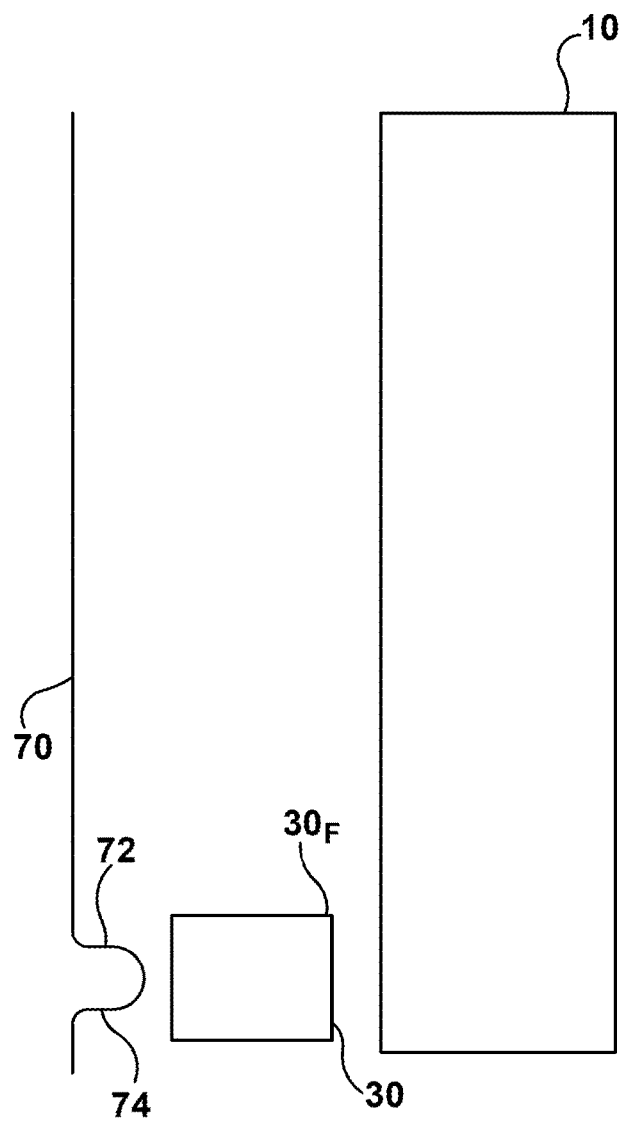
FIG. 4 illustrates a schematic representation of a waveform generated from a cross-lane projection in accordance with one embodiment of an apparatus illustrating principles of the present invention.

With reference to FIGS. 1 and 4, the controller 36 identifies a wave-form 70 in the images based on the signals received from the at least one sensor 16. The controller 36 also identifies the specific sensor 16 (e.g., the third sensor, located at the rear of the ego-vehicle, $16_3$) from which a leading edge 72 of the wave-form 70 image was received. It is assumed that a wave-form 70 image represents another vehicle (e.g., the second vehicle 30) and that the leading edge 72 represents the front of the other vehicle (e.g., the front $30_F$ second vehicle 30). In addition, the controller 36 determines a velocity and acceleration of the second vehicle 30 based on, for example, movement (e.g., a velocity and acceleration) of the leading edge 72 of the wave-form 70. Based on the velocity and acceleration of the second vehicle 30 (e.g., the leading edge 72 of the wave-form 70), the controller 36 determines when the leading edge 72 of the wave-form 70 representing the second vehicle 30 will cease being received from the current sensor (e.g., the third sensor $16_3$) and pass to the next, approximately mid-vehicle, sensor (e.g., the second sensor $16_2$). For example, the controller 36 may determine the leading edge 72 of the wave-form 70 representing the image of the second vehicle 30 will cease being within range of the third sensor $16_3$ and start being within range of the next sensor (e.g., the second sensor $16_2$) in about two (2) seconds. In other words, in about two (2) seconds, the leading edge 72 of the wave-form 70 representing the image of the second vehicle 30 will be within an overlapping range of the respective images represented by two (2) of the respective sensors 16 (e.g., the third sensor $16_3$ and the second sensor $16_2$). Then, if the velocity and acceleration of the second vehicle 30 relative to the first vehicle 10 is maintained, in about one (1) second, the controller 36 begins reviewing images produced by the signals received by both the third and second sensors $16_{3,2}$ (e.g., the overlap between the third and second sensors $16_{3,2}$). Then, if the velocity and acceleration of the leading edge 72 of the wave-form 70 representing the second vehicle 30 relative to the first vehicle 10 is maintained, after one (1) more second the controller 36 confirms the wave-form 70 image of the second vehicle 30 is in the image produced by the signals received from the second sensor $16_2$. Similarly, the controller 36 predicts when the leading edge 72 of the wave-form 70 representing the second vehicle 30 will no longer be in the overlapping range of the third and second sensors $16_{3,2}$ and will only be visible by the second sensors $16_2$. The controller 36 predicts and identifies the at least one sensor 16 from which the leading edge 72 of the wave-form 70 is received to conserve processing demands.

The cross lane projection is used to form a time-difference of a cross lane sum. One first adds the pixels that orthogonally traverse the lane, which is assumed to be either parallel to the ego vehicle 10 side or orthogonal to the detected lane markings 48. The lane markings 48 may have been found and tracked earlier, using known methods, such as MORE. As both the lane marking detection and surround view image creation are done in the ground plane, and both of these ground planes have been referenced in a calibration step, the orthogonal directions are well defined (also in the image plane, i.e. pixel-wise).

The cross lane projection takes an assumed or detected lane width, adds pixels in the orthogonal sense across this, and produces a 1-dimensional projection. This 1-dimensional projection is compared with its previous value(s), taken over time, and the areas of significant (set by a threshold) difference, may be taken as corresponding to movement in the lane (e.g. the leading edge of a passing vehicle). The front-most location of significant difference may be taken as corresponding to the leading edge of the vehicle.

Since it is assumed the other vehicle (e.g., the second vehicle 30) includes a front license plate $42_F$, the controller 36 begins recording a front image sequence at the leading edge 72 of the wave-form 70. In addition, since it is assumed the other vehicle (e.g., the second vehicle 30) includes a rear license plate $42_R$, the controller 36 also begins recording a rear image sequence at a trailing edge 74 of the wave-form 70.

In one embodiment, the controller 36 at least one of stores the front image sequence and the rear image sequence in a memory 80 and transmits the front image sequence and/or the rear image sequence to a remote 82 to be processed for identifying the license plate identifier (e.g., the license plate number and/or letters). The processor 82 may be included as part of the controller 36, remote from the controller 36 but still on the vehicle 10, or remote from the vehicle 10. It is contemplated that the controller 36 wirelessly transmits the front image sequence and/or the rear image sequence to the remote processor 82 via radio-frequency (RF) signals. However, it is also contemplated that the controller 36 transmits the front image sequence and/or the rear image sequence to the remote processor 82 via a wired connection and/or a portable unit that communicates with both the controller 36 and the remote processor 82. In the illustrated embodiment, the memory 80 electrically communicates with the controller 36 via the vehicle communication bus 40. However, other embodiments in which the memory 80 directly electrically communicates with the controller 36 are also contemplated.

The controller 36 acts as a means for identifying movement of any of the other vehicles (e.g., any of the second vehicle 30, the third vehicle 32, and the fourth vehicle 54) along, and within the predetermined perpendicular distance away from, the driver's side 22 of the first vehicle 10, based on the signals representing the respective image from at least one of the sensors 16. The controller 36 also acts as a means for predicting the position of any of the license plates 42, 60, 62 of the other vehicles 30, 32, 54 based on the movement of the respective other vehicle. The controller 36 also acts as a means for determining the status of the stop notification to any of the other vehicles 30, 32, 54.

Figure 5:
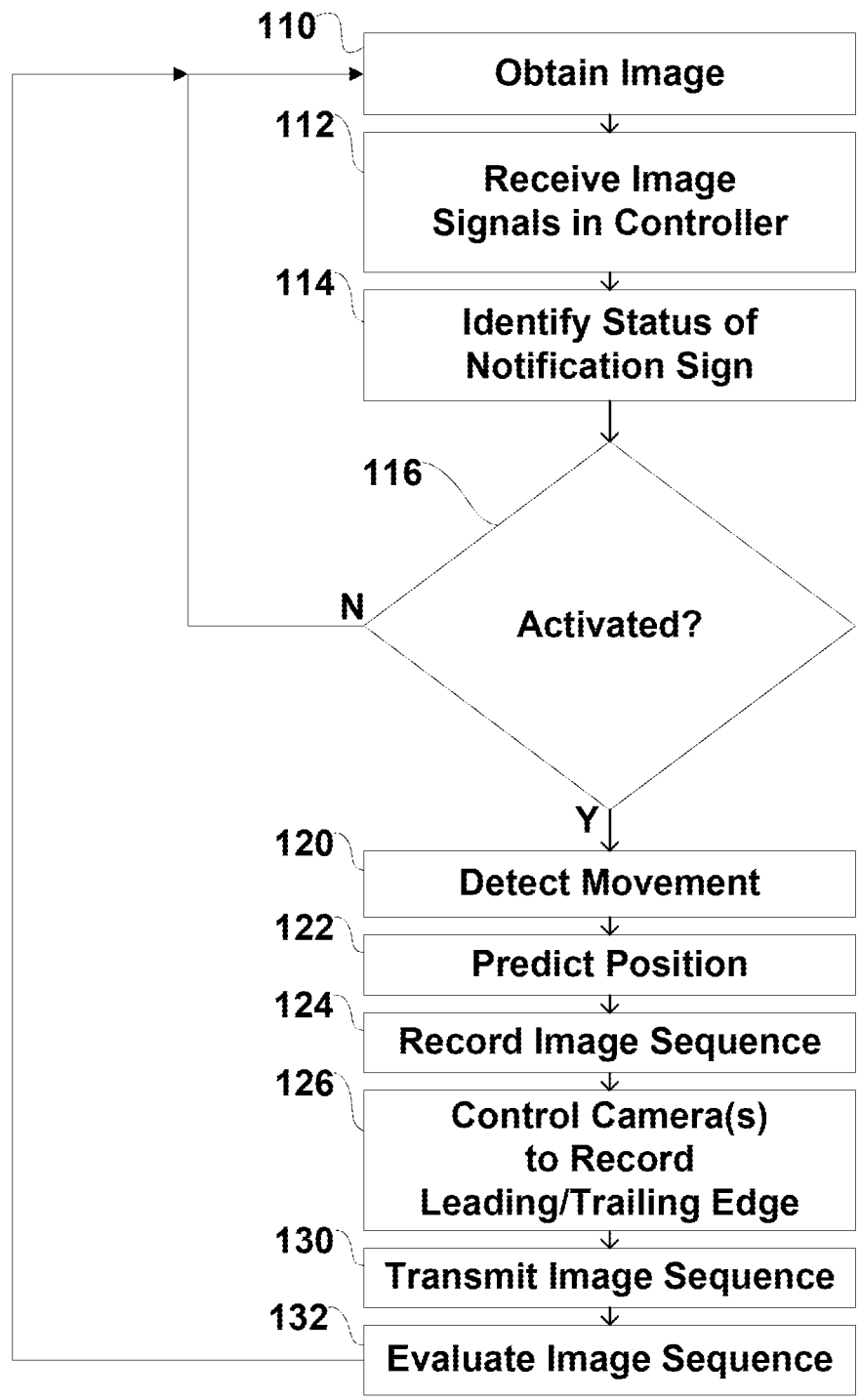
FIG. 5 is an exemplary methodology of recording an image sequence in accordance with one embodiment illustrating principles of the present invention.

With reference to FIG. 5, an exemplary methodology of the system shown in FIGS. 1-4 for recording an image sequence is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

In a step 110, a notification image of the notification sign 50 is obtained by the at least one sensor 16. As discussed above, the respective images received by the at least one sensor 16 provide the gapless view along, and within the predetermined perpendicular distance from, the driver's side 22 of the vehicle 10. Signals indicative of the notification image of the notification sign 50 are received by the controller 36 in a step 112. A status of the notification sign 50 is identified, based on the signals indicative of the notification image, by the controller 36 in a step 114. For example, the controller 36 identifies whether the status of the notification sign 50 is either activated or non-activated in the step 114. A determination is made, in a step 116, whether the notification sign 50 is activated or non-activated. If it is determined in the step 116 that the notification sign 50 is not activated, control returns to the step 110 for obtaining a next notification image of the notification sign 50. On the other hand, if it is determined in the step 116 that the notification sign 50 is activated (as discussed above), control passes to a step 120 where the controller 36 determines a stop notification is active to other vehicles (e.g., the second vehicle 30).

In the step 120 movement of any of the other vehicles (e.g., the second vehicle 30) is detected within the predetermined perpendicular distance away from the driver's side 22 of the vehicle 10 based images taken by at least one of the sensors $16_{1,2,3}$. As discussed above, movement of any of the other vehicles (e.g., the second vehicle 30) is detected by analyzing movement of the wave-form 70, which is generated using a cross-lane projection from at least one of the sensors $16_{1,2,3}$.

A position of, for example, a front license plate $42_F$ on the second vehicle 30 is predicted, in a step 122, based on the movement of the second vehicle 30 relative to the vehicle 10. An image sequence is recorded at the vicinity of the predicted position of, for example, the front license plate $42_F$ on the second vehicle 30 in a step 124. Obviously the predicted position of, for example, the front license plate $42_F$ on the second vehicle 30 may continuously change because of the movement of the second vehicle 30 relative to the vehicle 10. The at least one sensor 16 is controlled, in a step 126 to record the image sequence at least one of the leading edge 72 and the trailing edge 74 of the wave-form 70.

The image sequence is transmitted to the processor 82 in a step 130. The image sequence is then evaluated in a step 132 by, for example, the processor 82 to identify the license plate identifier. Control then returns to the step 110 for obtaining a next notification image of the notification sign 50.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller, the controller being adapted to:
   receive respective images from a sensor of a first vehicle, the images providing a gapless view along, and within a predetermined perpendicular distance away from, a side of the first vehicle;
   detect movement of a second vehicle along, and within the predetermined perpendicular distance away from, the side of the first vehicle, based on at least one of the images and by analyzing movement of a wave form generated by a time-differenced cross-lane projection from the sensor;
   control the sensor to record the image sequence at a leading edge of the wave form;
   receive second respective images from a second sensor of the first vehicle, the second images providing a second gapless view along, and within the predetermined perpendicular distance away from, the side of the first vehicle;
   control the second sensor to record the image sequence at the leading edge of the wave form, wherein when the leading edge is within a range of a border between images from the sensor and the second sensor, the sensor and the second sensor are controlled to record the image sequence about the leading edge of the wave form; and
   predict a position of a front of the second vehicle based on the movement of the second vehicle and record an image sequence at the position.

2. The controller as set forth in claim 1, wherein the controller is further adapted to:
   record the image sequence based on a status of a stop notification.

3. The controller as set forth in claim 2, wherein the controller is further adapted to:
   receive a notification image of a notification sign on the first vehicle, the notification image being obtained by the sensor; and
   identify, based on the notification image, the status of the stop notification to the second vehicle.

4. The controller as set forth in claim 3, wherein:
   if the notification image indicates the notification sign is extended a predetermined distance from the side of the first vehicle, the controller is adapted to identify the status of the stop notification as initiated.

5. The controller as set forth in claim 4, wherein:
   the controller is adapted to compare the notification image with a template image to determine if the notification sign is extended the predetermined distance.

6. The controller as set forth in claim 2, wherein the controller is further adapted to:
   receive a notification image of a notification flasher on the first vehicle, the notification image being obtained by the sensor; and
   identify, based on the notification image, the status of the stop notification to the second vehicle.

7. The controller as set forth in claim 1, wherein:
   the predetermined perpendicular distance is between about 5 m and 15 m.

8. The controller as set forth in claim 1, wherein the controller is further adapted to:
   evaluate the leading edge in the image sequence for identifying at least one of a vehicle leading edge region and a license plate identifier.

9. The controller as set forth in claim 8, wherein the controller is adapted to:
   transmit the image sequence to a processor remote from the vehicle for identifying at least one of a character sequence of the vehicle leading edge region and the license plate.

10. The controller as set forth in claim 1, wherein the controller is further adapted to:
    identify an additional lane based on a lane marking;
    determine an expected direction of the second vehicle based on the lane marking of the additional lane; and
    detect the movement of the second vehicle in the expected direction of the second vehicle.

11. The method as set forth in claim 10, wherein the controller is further adapted to:
    identify another additional lane based on an additional lane marking;
    determine an expected direction of a third vehicle based on the additional lane marking of the other additional lane; and
    predict movement of the third vehicle in the expected direction of the third vehicle.

12. The controller as set forth in claim 1, wherein the sensor is a camera.

13. A vehicle system, comprising:
    a plurality of sensors providing a gapless view along, and within a predetermined perpendicular distance away from, a side of a vehicle including the vehicle system; and
    a controller, included in a surround view system on the vehicle, receiving respective signals representing images taken by the plurality of sensors included in the surround view system on the vehicle, the controller identifying movement of another vehicle along, and within the predetermined perpendicular distance away from, the side of the vehicle, based on the signals representing the respective image from at least one of the sensors and detecting the movement of the other vehicle by analyzing movement of a wave form generated by a time-differenced cross-lane projection from at least one of the sensors, the controller predicting a position of a license plate of the other vehicle based on the movement of the other vehicle and recording an image sequence at the predicted position, wherein when the license plate is within a range of a border between images from two of the plurality of sensors, the plurality of sensors are controlled to record the image sequence about a leading edge of a waveform of the license plate.

14. The vehicle system as set forth in claim 13, wherein:
    the predetermined perpendicular distance is between about 5 m and 15 m.

15. The vehicle system as set forth in claim 14, wherein:
    the sensors include wide-angle lenses for recording the respective image sequences at the predicted position.

16. The vehicle system as set forth in claim 13, further including:
    a notification sign to notify a driver of the other vehicle to not enter within the predetermined perpendicular distance away from the side of the vehicle because passengers are loading/unloading to/from the vehicle.

17. The vehicle system as set forth in claim 16, wherein:
the signals received from at least one of the sensors include an image of the notification sign; and
the controller determines a status of the notification sign to notify the driver of the other vehicle based on the image of the notification sign.

18. The vehicle system as set forth in claim 17, wherein:
the controller determines the status of the notification sign by comparing the image of the notification sign with a template image.

19. A method for recording an image sequence, the method comprising:
receiving respective images from a plurality of sensors of a first vehicle, the images providing a gapless view along, and within a predetermined perpendicular distance away from, a side of the first vehicle;
detecting movement of a second vehicle along, and within the predetermined perpendicular distance away from, the side of the first vehicle, based on at least one of the images and by analyzing movement of a wave form generated by a time-differenced cross-lane projection from the plurality of sensors;
controlling the plurality of sensors to record the image sequence at a leading edge of the wave form, wherein when the leading edge is within a range of a border between images from two of the plurality of sensors, the plurality of sensors are controlled to record the image sequence about the leading edge of the wave form;
predicting a position of a front of the second vehicle based on the movement of the second vehicle; and
recording an image sequence at the position.

20. The method as set forth in claim 19, wherein the recording step includes:
recording the image sequence based on a status of a stop notification.

21. The method as set forth in claim 20, further including:
receiving a notification image of a notification sign on the first vehicle, the notification image being obtained by at least one of the plurality of sensors; and
identifying, based on the notification image, the status of the stop notification to the second vehicle.

22. The method as set forth in claim 21, wherein the identifying step includes:
if the notification image indicates the notification sign is extended a predetermined distance from the side of the first vehicle, identifying the status of the stop notification as initiated.

23. The method as set forth in claim 19, further including:
evaluating the leading edge in the image sequence for identifying an identifier on the license plate.

24. The method as set forth in claim 19, further including:
detecting the movement of the second vehicle based on a gray level of an adjacent lane.

25. The method as set forth in claim 19, further including:
identifying an additional lane based on a lane marking;
determining an expected direction of the second vehicle based on the lane marking of the additional lane; and
detecting the movement of the second vehicle in the expected direction of the second vehicle.

26. The method as set forth in claim 25, further including:
identifying another additional lane based on a lane marking;
determining an expected direction of a third vehicle based on the lane marking of the other additional lane; and
predicting movement of the third vehicle in the expected direction of the third vehicle.

* * * * *